(12) United States Patent
Valois et al.

(10) Patent No.: US 10,168,538 B2
(45) Date of Patent: Jan. 1, 2019

(54) SYMMETRIC MICRO-OPTIC MODULE

(71) Applicant: Massachusetts Institute of Technology, Cambridge, MA (US)

(72) Inventors: Michael H. Valois, Lancaster, MA (US); David R. Crompton, Lowell, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 15/950,993

(22) Filed: Apr. 11, 2018

(65) Prior Publication Data

US 2018/0299682 A1    Oct. 18, 2018

Related U.S. Application Data

(60) Provisional application No. 62/484,469, filed on Apr. 12, 2017.

(51) Int. Cl.
| | |
|---|---|
| G02B 27/09 | (2006.01) |
| G02B 6/32 | (2006.01) |
| G02B 6/42 | (2006.01) |
| G02B 27/30 | (2006.01) |

(52) U.S. Cl.
CPC ......... *G02B 27/0922* (2013.01); *G02B 6/325* (2013.01); *G02B 6/4206* (2013.01); *G02B 6/4267* (2013.01); *G02B 27/0955* (2013.01); *G02B 27/30* (2013.01)

(58) Field of Classification Search
CPC .... G02B 6/325; G02B 6/4206; G02B 6/4267; G02B 27/30; G02B 27/0955; G02B 27/0922
See application file for complete search history.

(56) References Cited

U.S. PATENT DOCUMENTS

| | | | |
|---|---|---|---|
| 5,150,280 A * | 9/1992 | Arai | G02B 6/42 |
| | | | 257/678 |
| 7,199,924 B1 * | 4/2007 | Brown | G02B 27/1006 |
| | | | 359/556 |
| 7,751,458 B2 * | 7/2010 | Regaard | H01S 5/4012 |
| | | | 372/101 |
| 9,810,383 B2 * | 11/2017 | Goutain | F21V 9/30 |

(Continued)

*Primary Examiner* — Akm Enayet Ullah
(74) *Attorney, Agent, or Firm* — Hamilton, Brook, Smith & Reynolds, P.C.

(57) ABSTRACT

A micro-optic module couples a pair of substrates to opposing sides of a fast-axis collimating lens and a beam twister. The arrangement of optical elements is oriented substantially parallel to a neutral plane defined by propagation paths of the light from each emitter of an array of laser emitters. The pair of substrates may have substantially the same coefficient of thermal expansion and coefficient of thermal conductivity, and the micro-optic module may be configured to exhibit symmetry of thermal loading about the neutral plane when the array of laser emitters emits light at an operational power level. The micro-optic module may be coupled with an array of laser emitters, for example a laser diode bar. The module exhibits thermal properties that facilitate a consistently focused light beam with minimal positional drift, which may enable efficient and reliable coupling of the light beam to optical fibers and other high-tolerance applications.

20 Claims, 9 Drawing Sheets
(7 of 9 Drawing Sheet(s) Filed in Color)

(56) References Cited

U.S. PATENT DOCUMENTS

| | | | |
|---|---|---|---|
| 2003/0174954 A1* | 9/2003 | Hamamoto | G02B 6/262 |
| | | | 385/39 |
| 2005/0084201 A1* | 4/2005 | Akashi | G02B 6/4201 |
| | | | 385/14 |
| 2006/0024006 A1* | 2/2006 | Kobayashi | G02B 6/4201 |
| | | | 385/94 |
| 2008/0084905 A1* | 4/2008 | Doerfel | G02B 27/0961 |
| | | | 372/43.01 |
| 2009/0129420 A1* | 5/2009 | Regaard | H01S 5/4012 |
| | | | 372/50.12 |
| 2013/0010451 A1* | 1/2013 | Mukaihara | G01R 33/0322 |
| | | | 362/19 |
| 2015/0362739 A1* | 12/2015 | Zambuto | G02B 27/141 |
| | | | 359/566 |
| 2015/0364901 A1* | 12/2015 | Deutsch | H01S 5/005 |
| | | | 372/38.05 |
| 2017/0288365 A1* | 10/2017 | Motofuji | H01S 5/022 |

* cited by examiner

Simulated temperature rise at full power

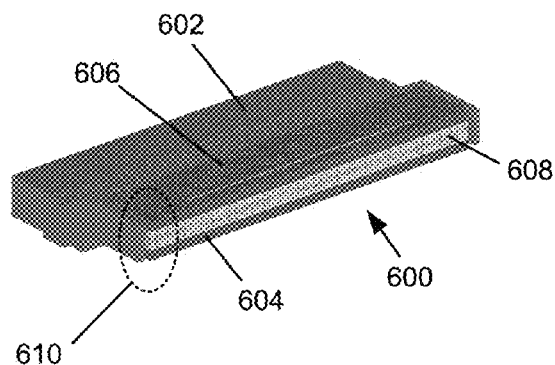
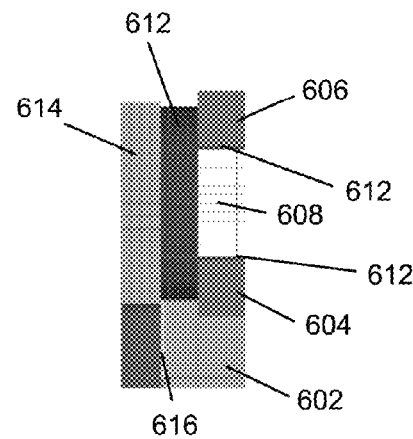
FIG. 6A   FIG. 6B
| Maximum stress | | Safe Allowable |
|---|---|---|
| | Stress, ksi | Stress, ksi |
| cooler | 6.3 | 30 |
| microlens | 0.7 | 1.5 |
| carrier | 0.4 | > 50 |
| mount epoxy | 2.7 | 3 |
| microlens epoxy | 1.7 | 3 |
FIG. 6C

SYMMETRIC MICRO-OPTIC MODULE

RELATED APPLICATION

This application claims the benefit of U.S. Provisional Application No. 62/484,469, filed on Apr. 12, 2017. The entire teachings of the above application are incorporated herein by reference.

BACKGROUND

An array of laser emitters (e.g., laser diode bar) may be used to produce a high-power laser output by aggregating the laser beams generated by the array of laser emitters. A portion of an example prior art laser system 100 is shown in FIGS. 1A and 1B, which depict a laser diode bar 102, and a micro-optic module 104 comprising a fast axis lens 106, a beam twister 108 and a mounting substrate 110. Ray segments 112 represent the beam paths of the light emitted by the laser emitters of the laser diode bar 102. The length (L), width (W) and height (H) of the micro-optic module 104 are shown in FIG. 1. Example dimensions of a representative micro-optic module are typically on the order of L=12 mm, W=4 mm, and H=1 mm.

The laser beams diverge quickly along a fast axis of the laser bar, and slowly along slow axis, resulting in a beam with an elliptical cross-section. A first optical lens 106, placed parallel to the line of laser outputs, may be used to collimate the fast axis components of the beams. A beam twister 108 may subsequently rotate the beams by 90 degrees. The first optical lens 106 and the beam twister 108 may be mounted on (e.g., bonded to) a base substrate 110 to form the micro-optic module 100. The base substrate is generally a structural component for the optical components (optical lens 106 and beam twister 108).

Further along the propagation path of the laser beam, a second optical lens 114 shown) may collimate the slow axis components of the beams, as shown in FIG. 1C. Following this collimation by the second optical lens 114, a third optical lens 116 may combine the beams from the laser diode bar 102 (and possibly the beams of one or more other stacked laser bars) for insertion into an optical fiber 118 or other target location. For clarity, only three laser emitters and propagation paths are shown in FIG. 1C, although the laser diode bar may include more or fewer laser emitters.

In operation, a fraction the laser light, produced by the array of laser emitters and propagating through the constituent optical components, may be absorbed by the optical components and cause the temperature of the micro-optic module to increase. The temperature increase, in turn, may cause the shape of the micro-optic module to change. As the module heats, geometrical asymmetries and differences in coefficients of thermal expansion (CTEs) of the module components may cause the module to deform. In the absence of such warping, the micro-optical system may produce a beam spot at a specific location and a suitably small size. As the module warps, the beam spot may move from the specific location and become larger (and less focused—i.e., fuzzier). Adjustments to the system may be made to mitigate the location change, but the adjustments may be time consuming and costly, and the loss of focus may be difficult to correct.

SUMMARY

The described embodiments are directed to a micro-optic module configured to receive laser light from an array of laser emitters. The micro-optic module may comprise a fast-axis collimating optical component, a beam twisting optical component, and a pair of mounting substrates. The mounting substrates are configured to "sandwich" the fast-axis collimating optical component and the beam twisting optical component, such that the resulting micro-optic module exhibits symmetry of thermal loading about a neutral plane, which is defined by the propagation paths of light from the array of laser emitters.

In one aspect, the invention may be an micro-optic module comprising a fast-axis collimating lens arranged to receive light from each emitter of an array of laser emitters, and a beam twister optical component arranged to receive light propagated through the fast axis collimating lens and rotate the received light as the received light propagates through the beam twister. The micro-optic module may further comprise a pair of substrates coupled to opposing sides of the fast-axis collimating lens and the beam twister (e.g., top and bottom), and substantially parallel to a neutral plane defined by propagation paths of the light from each emitter of the array of laser emitters. The pair of substrates may have substantially the same coefficient of thermal expansion (CTE) and coefficient of thermal conductivity as each other. The micro-optic module may further be configured to exhibit symmetry of thermal loading about the neutral plane when the array of laser emitters emits light at an operational power level.

The fast axis collimating lens and the beam twister may have a CTE that is substantially the same as the pair of substrates. The pair of substrates may be coupled to the fast-axis collimating lens and the beam twister by an ultraviolet (UV)-curing adhesive. The pair of substrates may have substantially the same material properties and substantially the same geometries as each other.

In another aspect, a laser diode module may comprise an array of laser emitters configured to emit light, and an optic module. The optic module may comprise a fast-axis collimating lens arranged to receive light from each emitter of an array of laser emitters, and a beam twister optical component arranged to receive light propagated through the fast axis collimating lens and rotate the received light as the received light propagates through the beam twister. The micro-optic module may further comprise a pair of substrates coupled to opposing sides of the fast-axis collimating lens and the beam twister, and substantially parallel to a neutral plane defined by propagation paths of the light from each emitter of the array of laser emitters. The pair of substrates may have substantially the same coefficient of thermal expansion (CTE) and coefficient of thermal conductivity as each other. The micro-optic module may further be configured to exhibit symmetry of thermal loading about the neutral plane when the array of laser emitters emits light at an operational power level.

The optic module may be coupled to the array of laser emitters by a thermally compliant mount that accommodates thermal expansion of one or more components of the optic mount while maintaining an alignment of the array of laser emitters to the fast axis collimating lens.

The thermally compliant mount may comprise a pair of blade flexure elements, each of which has a first end and a second end. The first end of each of the pair of blade flexure elements may be fixedly attached to a longitudinal end of a laser emitter array housing, and the second end of each of the pair of blade flexure elements may be fixedly attached to a longitudinal end of the optic module. The pair of blade elements may be configured to apply a substantially equal physical force to the longitudinal ends of the optic module.

Each of the pair of blade elements may comprise at least one aperture through which an adhesive is passed to fixedly attach each blade element to the laser emitter array housing and to the optic module. The adhesive may be an epoxy.

In an embodiment, each of the pair of substrates may be a sapphire substrate. The array of laser emitters is a laser diode bar.

In another aspect, the invention may be a high power laser diode light source, comprising (i) a laser diode stack comprising two or more laser diode modules, (ii) a slow axis lens module comprising a plurality of slow axis lenses arranged to receive light propagated through the optic module, and (iii) a focusing lens module configured to focus the light propagated through the slow axis lens module to a target spot. Each of the two or more laser diode modules may comprise an array of laser emitters configured to emit light and an optic module. The optic module may comprise a fast axis collimating lens arranged to receive the light from each emitter of the array of laser emitters, a beam twister arranged to receive the light propagated through the fast axis collimating lens and to rotate the light as the light propagates through the beam twister, and a pair of substrates coupled to opposing sides of the fast-axis collimating lens and the beam twister, and substantially parallel to a neutral plane defined by propagation paths of the light from each emitter of the array of laser emitters. The pair of substrates may have substantially the same coefficient of thermal expansion (CTE) and coefficient of thermal conductivity. The optic module may be configured to exhibit symmetry of thermal loading about the neutral plane when the array of laser emitters emit light at an operational power level.

BRIEF DESCRIPTION OF THE DRAWINGS

The patent or application file contains at least one drawing executed in color. Copies of this patent or patent application publication with color drawings will be provided by the Office upon request and payment of the necessary fee.

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIGS. 6A, 6B and 6C show the results of a finite element model analysis of an example embodiment of a micro-optic module undergoing a thermal soak.

DETAILED DESCRIPTION

A description of example embodiments follows.

The teachings of all patents, published applications and references cited herein are incorporated by reference in their entirety.

Figure 1A:
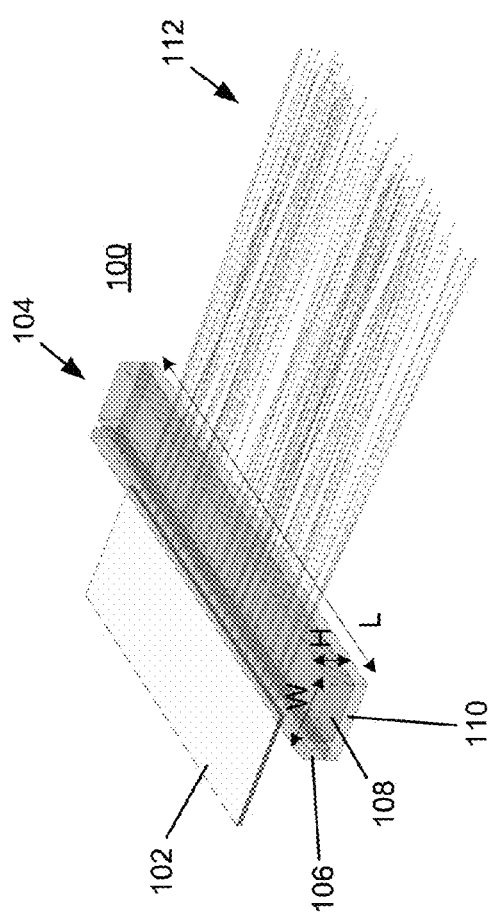
FIGS. 1A, 1B and 1C show portions of an example of a prior art laser system.
Figure 1B:
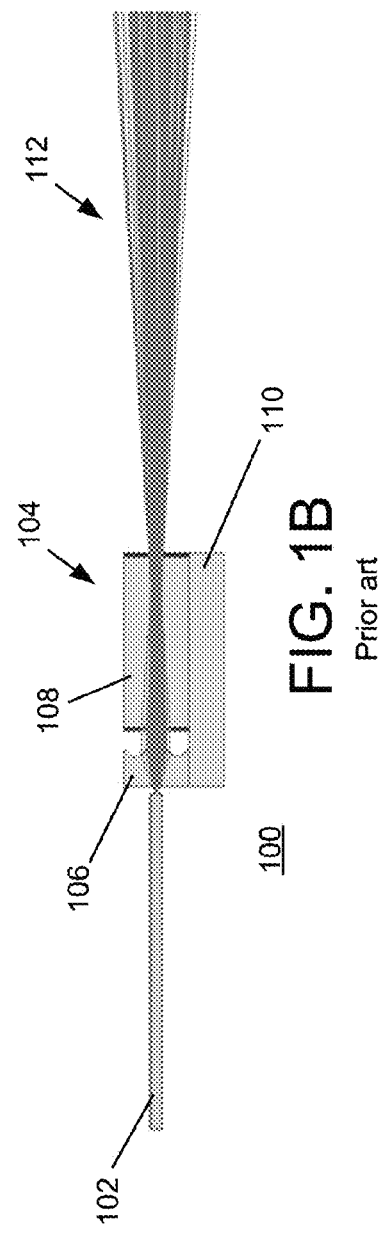
Figure 1C:
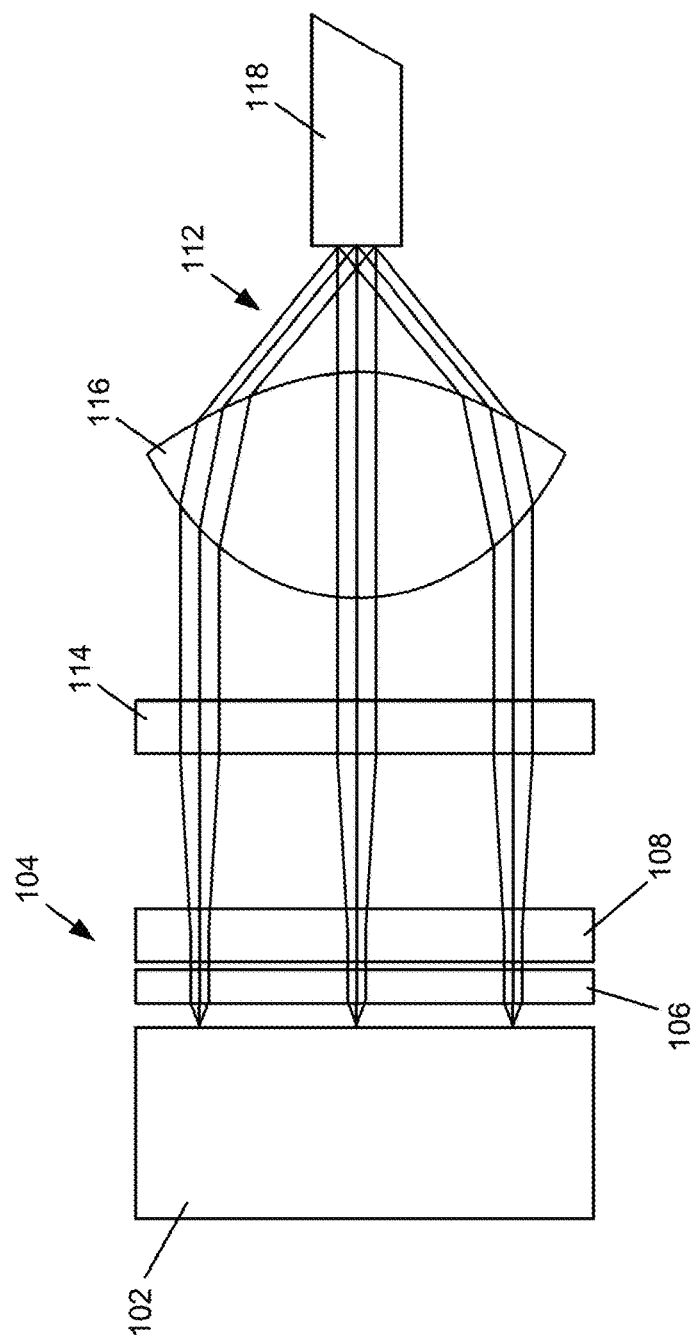
Figure 2A:
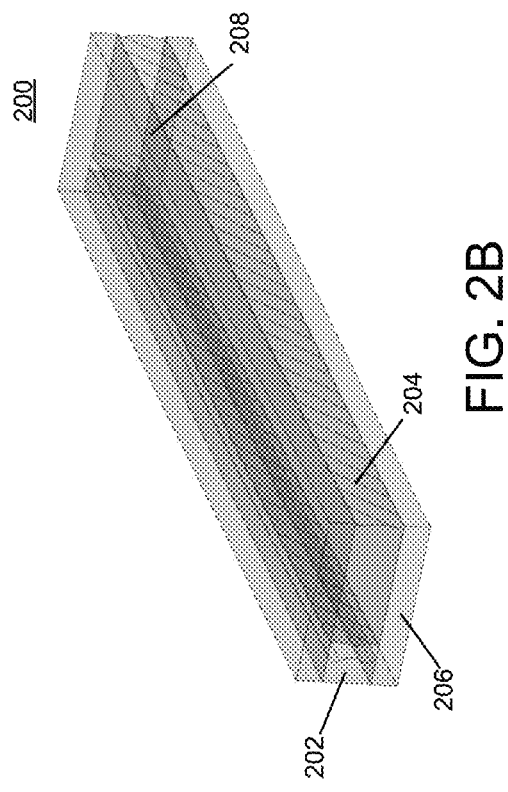
FIGS. 2A through 2E show an example embodiment of a micro-optic module according to the invention.

FIGS. 2A through 2E depict an example embodiment of a micro-optic module 200 according to the invention. FIG. 2A shows an exploded view of the micro-optic module 200, comprising a fast axis collimating (FAC) lens 202, a beam twister 204, a first substrate 206, and a second substrate 208. The fast axis collimating lens 202 is constructed and arranged to receive light from each emitter of an array of laser emitters (not shown). The beam twister 204 is constructed and arranged, with respect to the fast-axis collimating lens 202, to receive light propagated through the fast-axis collimating lens 202 and rotate the received light as the received light propagates through the beam twister 204. A first substrate 206 and a second substrate 208 may be coupled to the fast-axis collimating lens 202 and the beam twister 204 on opposing positions therebetween, i.e., on the top and on the bottom of the fast axis-collimating lens 202 and beam twister 204 pair, as shown in FIGS. 2B through 2E. The coupling may comprise binding the substrates to the fast-axis collimating lens 202 and the beam twister 204 with an adhesive, for example with an ultraviolet-curing adhesive.

The first substrate 206 and second substrate 208 may be arranged to be substantially parallel to a neutral plane 210 defined by propagation paths of the light from each emitter of the array of laser emitters. The pair of substrates 206, 208 may be fabricated to have substantially the same coefficient of thermal expansion (CTE) and coefficient of thermal conductivity. The optic module 200 may be configured to exhibit symmetry of thermal loading about the neutral plane when the array of laser emitters emits light at an operational power level.

Figure 2B:
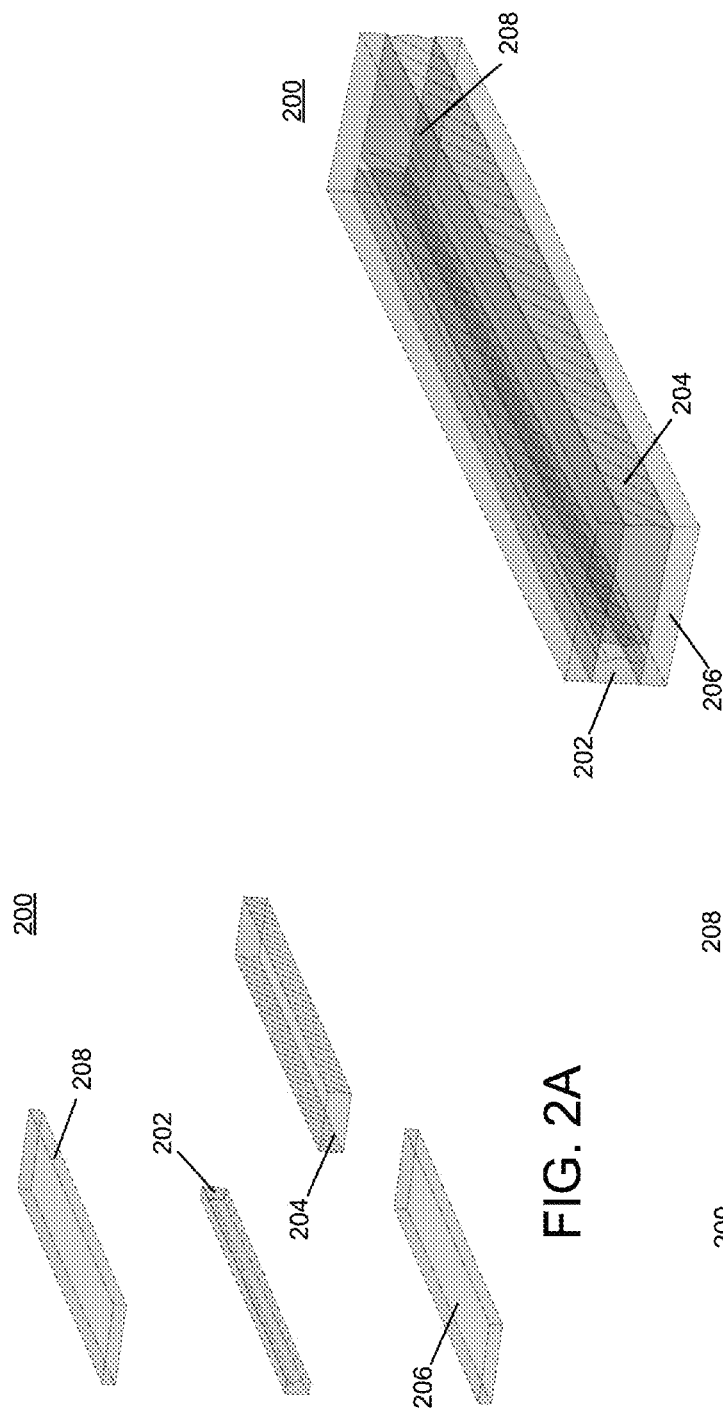
Figure 2C:
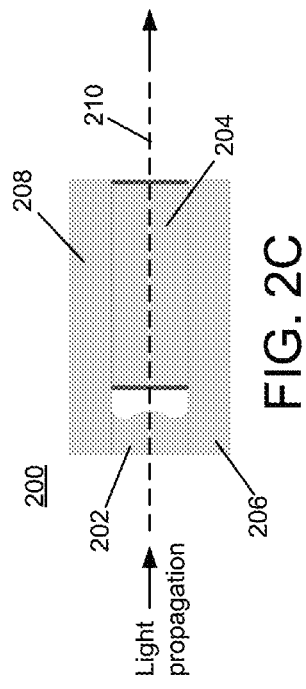

FIG. 2B depicts a perspective view of the example micro-optic module 200, and FIG. 2C depicts an end view of the example micro-optic module 200.

In an embodiment, the material of the first substrate 206 and the second substrate 208 are chosen so that their coefficients of thermal expansion (CTEs) are substantially the same as the fast-axis collimating lens 202 and the beam twister 204. Such substantially equal CTEs may prevent damage to the micro-optic module 200 during significant temperature excursions of the module 200. For example, the material of the first and second substrates 206, 208 may be sapphire. In an example embodiment, the first and second substrates 206, 208 may be sapphire with the C-axis oriented laterally, because the CTE of sapphire parallel to the C-axis closely matches that of the fast-axis collimator lens and beam twister materials. Further, the thermal conductivity of sapphire is much greater than other potential candidate materials. In operation, a closely matched CTE of component materials serves to reduce thermally induced stresses, while a high thermal conductivity serves to reduce temperature gradients and keep module temperatures low.

In other embodiments, the CTE of the pair of substrates 206, 208 may be substantially different from the fast-axis collimating lens 202 and the beam twister. The amount of difference in the CTE between the substrates 206, 208, and the fast-axis collimating lens 202 and beam twister 204, may determine the temperature range to which the micro-optic module may safely be subjected, without damaging the micro-optic module.

In embodiments, the first substrate 206 and the second substrate 208 may have substantially the same material properties and substantially the same geometries. The micro-optic module may be constructed and arranged to exhibit geometric symmetry about the neutral plan described herein, which may contribute to symmetrical thermal loading about the neutral plane during operation, i.e., when laser light is propagated through the fast-axis collimating lens and the beam twister.

Figure 2D:
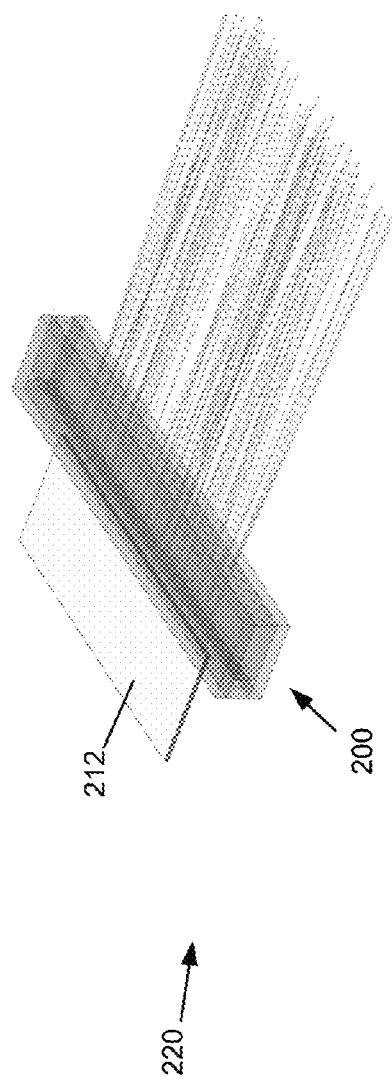
Figure 2E:
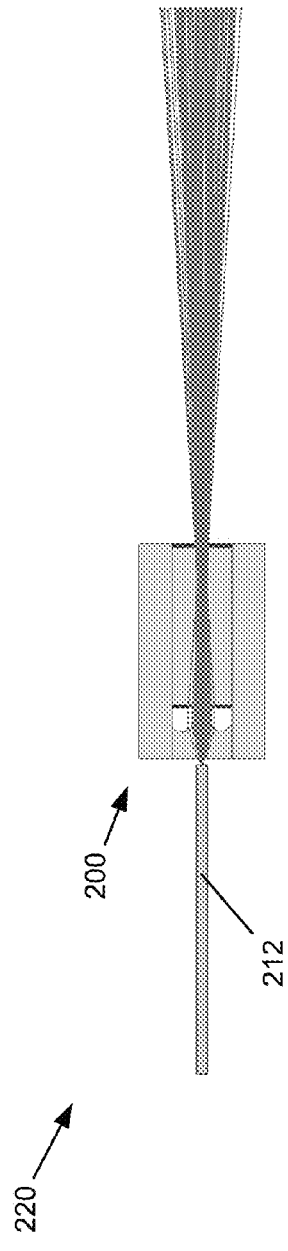

In an embodiment, the optic module 200 may be combined with a laser diode bar 212 to form a laser diode module 220, as shown in a perspective view in FIG. 2D, and in a side view in FIG. 2E. The laser diode bar includes an array of laser emitters each configured to emit light.

Figure 3A:
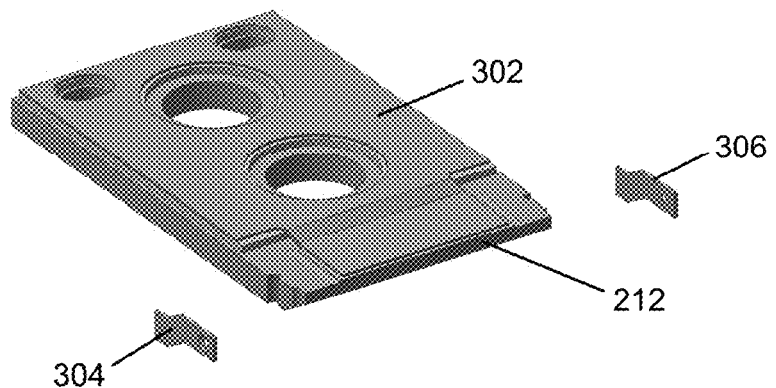
FIGS. 3A through 3E show an example thermally compliant mount for coupling a laser diode bar to a micro-optic module according to the invention.
Figure 3B:
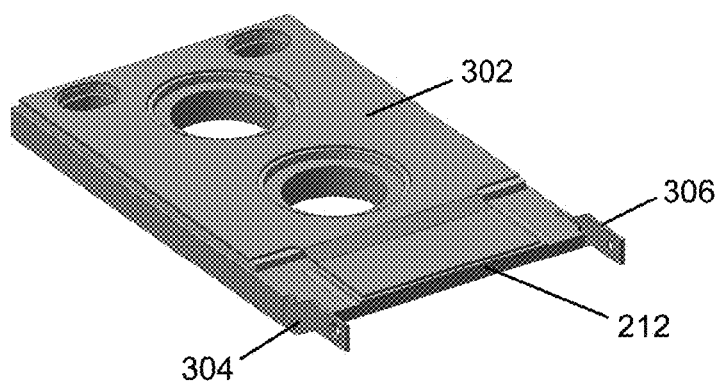
Figure 3C:
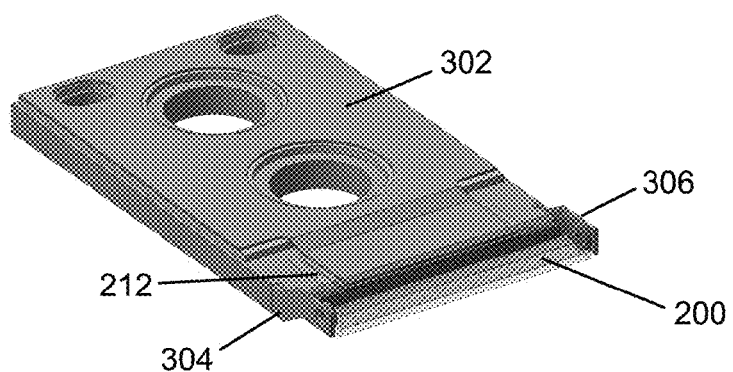
Figure 3D:
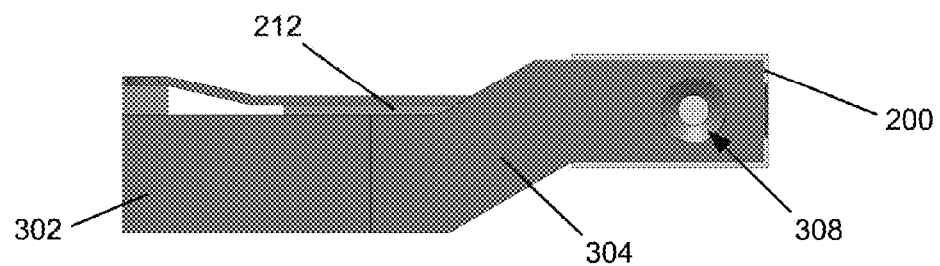
Figure 3E:
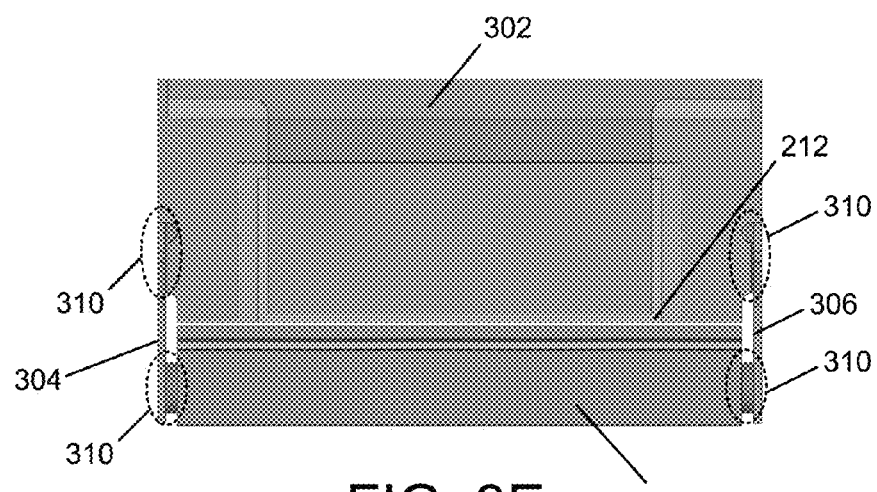

The laser diode bar 212 may be coupled to the optic module 200 by a thermally-compliant mount, to accommodate longitudinal thermal expansion of the optic module 200. FIGS. 3A through 3E depict an example thermally compliant mount for coupling a laser diode bar 212 to a micro-optic module 200. In these figures, the laser diode bar 212 is disposed in a cooling module 302. A pair of thermally compliant mount blade flexures 304, 306 are shown in an exploded view in FIG. 3A, and secured to the cooling module 302 in FIGS. 3B-3E. FIG. 3C shows the micro-optic module 200 coupled to the laser diode bar 212, and held in place by the thermally compliant mount blade flexures 304, 306. FIG. 3D shows a side view of the laser diode bar 212, the micro-optic module 200, and a portion of the cooling module 306, along with the thermally compliant mount blade flexure 304. An epoxy injection hole 308 in the blade flexure 304 provides an aperture through which epoxy may be disposed to fixedly attach the blade flexure 304 to the micro-optic module 200. As shown in FIG. 3E, epoxy deployments 310 may be used to fixedly attach the thermally compliant mount blade flexures 304, 306 to the cooling module 302 and to the micro-optic module 200. The thermally compliant mount blade flexures 304, 306 may be amenable to a limited amount of bending, which may accommodate longitudinal thermal expansion of the micro-optic module 200.

Figure 4A:
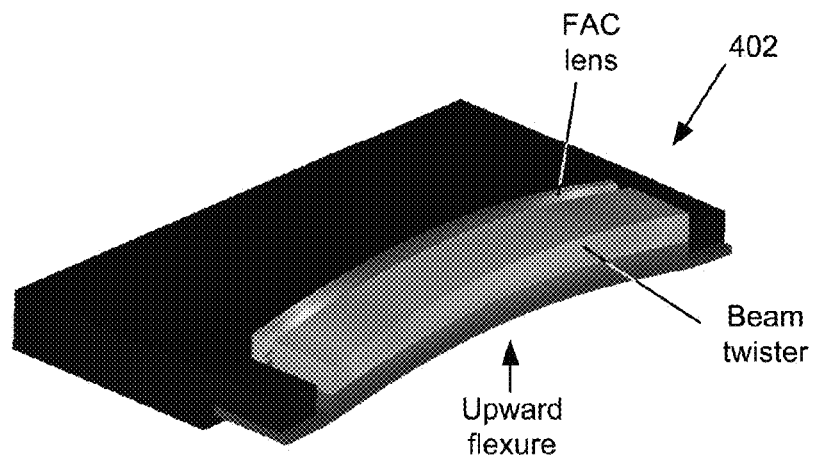
FIGS. 4A and 4B demonstrate performance differences between a conventional, prior art micro-optic module and an example micro-optic module according to the described embodiments.
Figure 4B:
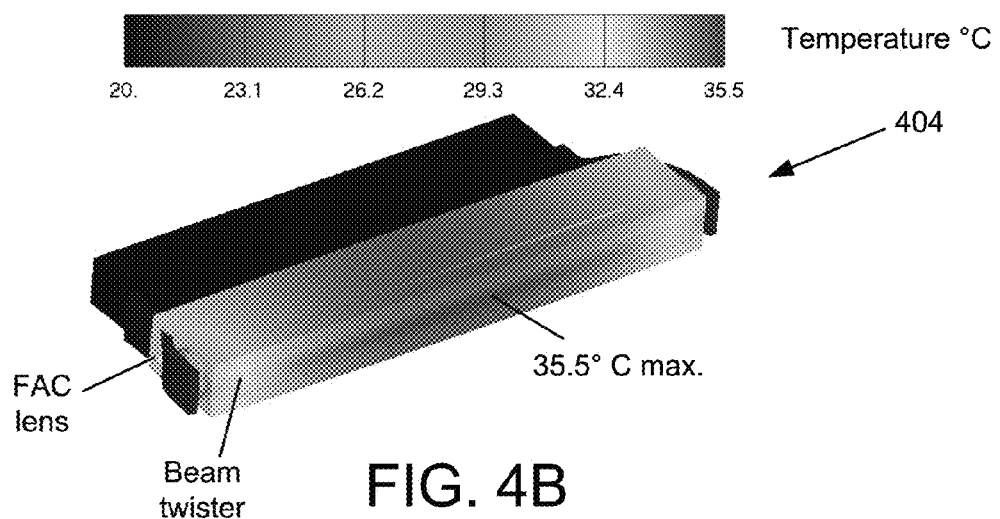

FIGS. 4A and 4B demonstrate performance differences between a conventional, prior art micro-optic module 402 (FIG. 4A) and an example micro-optic module according to the described embodiments 404 (FIG. 4B).

As FIG. 4A shows, the asymmetric nature of the prior art module (i.e., only one substrate on a single side of the lens/beam twister pair) may cause an upward flexure of the module as high power laser light passes through the optical components of the module, causing the module temperature to increase. FIG. 4A shows a resulting asymmetrical thermal loading.

FIG. 4B shows a more symmetric thermal loading on the micro-optic module 404, due to the matched pair of substrates symmetrically disposed on two sides of the lens/beam twister pair. As FIG. 4B illustrates, the symmetrical thermal loading serves to prevent the upward flexure of the micro-optic module, even though the overall temperature of the micro-optic module 404 is higher with respect to the prior art micro-optic module 402.

This result is somewhat counter-intuitive. Since the heating of the optical components of the micro-optic module, by the propagated laser energy, is understood to cause the flexure of the module, a reasonable action to remedy the problem would be to reduce the temperature of the micro-optic module. Adding a second substrate to the micro-optic module would appear to exacerbate the problem by further enclosing the module and reducing available paths for dissipating the thermal energy of the module, thereby causing further module deformation. The described embodiments, however, demonstrate that the overall temperature of the micro-optic module 404 is less critical than symmetrical thermal loading of the micro-optic module 404, at least in terms of mitigating module deformation.

Figure 5:
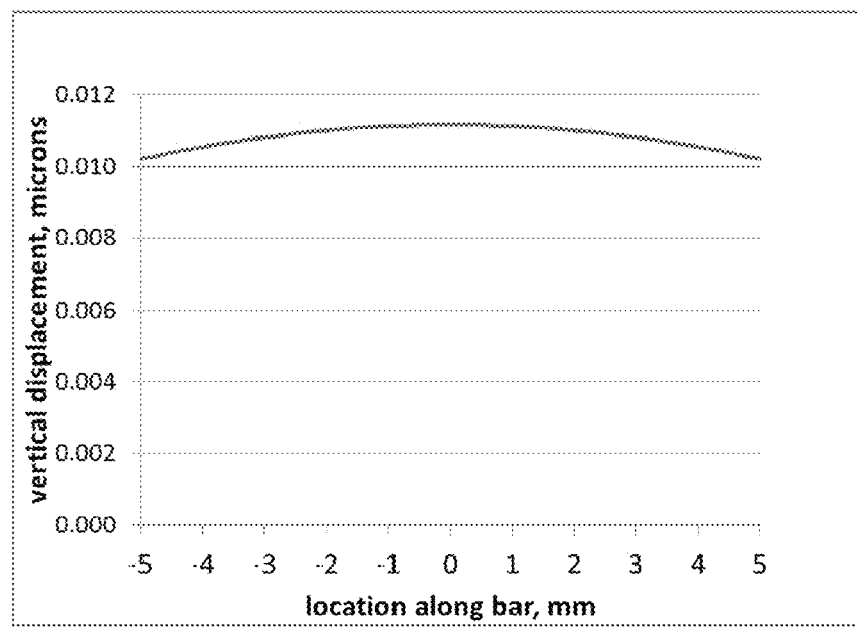
FIG. 5 shows vertical displacement of the micro-optic module of an example embodiment of the module receiving laser light at full power.

FIG. 5 shows vertical displacement of the micro-optic module 404 of an example embodiment, corresponding to the temperature profile shown in FIG. 4B, of the module 404 receiving laser light at full power. Under full power, FIG. 5 shows that the stability of the optical components of the micro-optic module is on the order of 1/100 of a micron.

FIGS. 6A, 6B and 6C show the results of a finite element model analysis of an example embodiment of a micro-optic module 600 according to the invention undergoing a thermal soak from 20° C. to −50° C. FIG. 6A shows a perspective view of a micro-optic module 600, comprising a cooling module 602 for a laser diode bar, substrates 604, 606, and optical components 608 of the module 600 (e.g., fast-axis collimating lens and beam twister). FIG. 6B depicts a finite element model of the region 610 shown in FIG. 6A. A first adhesive 612 (e.g., epoxy) couples the optical components 608 to the substrates 604, 606 and couples the optical components 608 to the mounting flexure 614. A second adhesive 616 couples the mounting flexure 614 to the cooling module 602. FIG. 6C shows the results of a finite element analysis of the model shown in FIG. 6B.

Differential thermal expansion within a device such as the micro-optic module can result in very high stress at cold temperatures. The symmetric mount approach of the described embodiments may mitigate such stresses and permit wider temperature range storage environments necessary for some applications. As shown in the results of FIG. 6C, the described embodiments of a micro-optic module may be capable of surviving temperatures as cold as −50° C. or lower without damage.

While example embodiments have been particularly shown and described, it will be understood by those skilled in the art that various changes in form and details may be made therein without departing from the scope of the embodiments encompassed by the appended claims.

What is claimed is:

1. A laser diode module, comprising:
an array of laser emitters configured to emit light; and
an optic module comprising:
a fast-axis collimating lens arranged to receive the light from each emitter of the array of laser emitters;
a beam twister arranged to receive the light propagated through the fast axis collimating lens and to rotate the light as the light propagates through the beam twister; and
a pair of substrates, coupled to opposing sides of the fast-axis collimating lens and the beam twister, and substantially parallel to a neutral plane defined by propagation paths of the light from each emitter of the array of laser emitters, the pair of substrates having substantially the same coefficient of thermal expansion (CTE) and coefficient of thermal conductivity;
the optic module configured to exhibit symmetry of thermal loading about the neutral plane when the array of laser emitters emit light at an operational power level.

2. The laser diode module of claim 1, wherein the collimating lens and the beam twister have a CTE that is substantially the same as the pair of substrates.

3. The laser diode module of claim 1, wherein the optic module is coupled to the array of laser emitters by a thermally compliant mount that accommodates thermal expansion of one or more components of the optic mount while maintaining an alignment of the array of laser emitters to the fast axis collimating lens.

4. The laser diode module of claim 3, wherein the thermally compliant mount comprises a pair of blade flexure elements, each having a first end and a second end, the first end of each of the pair of blade flexure elements being fixedly attached to a longitudinal end of a laser emitter array housing, and the second end of each of the pair of blade flexure elements being fixedly attached to a longitudinal end of the optic module.

5. The laser diode module of claim 4, wherein the pair of blade elements are configured to apply a substantially equal physical force to the longitudinal ends of the optic module.

6. The laser diode module of claim 4, wherein each of the pair of blade elements comprises at least one aperture through which an adhesive is passed to fixedly attach each blade element to the laser emitter array housing and to the optic module.

7. The laser diode module of claim 6, wherein the adhesive is an epoxy.

8. The laser diode module of claim 1, wherein each of the pair of substrates is a sapphire substrate.

9. The laser diode module of claim 1, wherein the array of laser emitters is a laser diode bar.

10. A micro-optic module comprising:
a fast-axis collimating lens arranged to receive light from each emitter of an array of laser emitters;
a beam twister arranged to receive light propagated through the fast axis collimating lens and rotate the received light as the received light propagates through the beam twister; and
a pair of substrates coupled to opposing sides of the fast-axis collimating lens and the beam twister, and substantially parallel to a neutral plane defined by propagation paths of the light from each emitter of the array of laser emitters, the pair of substrates having substantially the same coefficient of thermal expansion (CTE) and coefficient of thermal conductivity;
the micro-optic module configured to exhibit symmetry of thermal loading about the neutral plane when the array of laser emitters emits light at an operational power level.

11. The optic module of claim 10, wherein the fast-axis collimating lens and the beam twister have a CTE that is substantially the same as the pair of substrates.

12. The optic module of claim 10, wherein the pair of substrates are coupled to the fast-axis collimating lens and the beam twister by an ultraviolet (UV)-curing adhesive.

13. The optic module of claim 10, wherein the pair of substrates have substantially the same material properties and substantially the same geometries.

14. A high power laser diode light source, comprising:
(i) a laser diode stack comprising two or more laser diode modules, each of which comprises:
an array of laser emitters configured to emit light; and
an optic module comprising:
a fast axis collimating lens arranged to receive the light from each emitter of the array of laser emitters;
a beam twister arranged to receive the light propagated through the fast axis collimating lens and to rotate the light as the light propagates through the beam twister; and
a pair of substrates coupled to opposing sides of the fast-axis collimating lens and the beam twister, and substantially parallel to a neutral plane defined by propagation paths of the light from each emitter of the array of laser emitters, the pair of substrates having substantially the same coefficient of thermal expansion (CTE) and coefficient of thermal conductivity;
the optic module configured to exhibit symmetry of thermal loading about the neutral plane when the array of laser emitters emit light at an operational power level;
(ii) a slow axis lens module comprising a plurality of slow axis lenses arranged to receive light propagated through the optic module; and
(iii) a focusing lens module configured to focus the light propagated through the slow axis lens module to a target spot.

15. The laser diode module of claim 14, wherein the collimating lens and the beam twister have a CTE that is substantially the same as the pair of substrates.

16. The laser diode module of claim 14, wherein the optic module is coupled to the array of laser emitters by a thermally compliant mount that accommodates thermal expansion of one or more components of the optic mount while maintaining an alignment of the array of laser emitters to the fast axis collimating lens.

17. The laser diode module of claim 16, wherein the thermally compliant mount comprises a pair of blade flexure elements, each having a first end and a second end, the first end of each of the pair of blade flexure elements being fixedly attached to a longitudinal end of a laser emitter array housing, and the second end of each of the pair of blade flexure elements being fixedly attached to a longitudinal end of the optic module.

18. The laser diode module of claim 17, wherein the pair of blade elements are configured to apply a substantially equal force to the longitudinal ends of the optic module.

19. The laser diode module of claim 17, wherein each of the pair of blade elements comprises at least one aperture through which an adhesive is passed to fixedly attach each blade element to the laser emitter array housing and to the optic module.

20. The laser diode module of claim 14, wherein each of the pair of substrates is a sapphire substrate.

* * * * *